United States Patent Office 3,259,280
Patented July 5, 1966

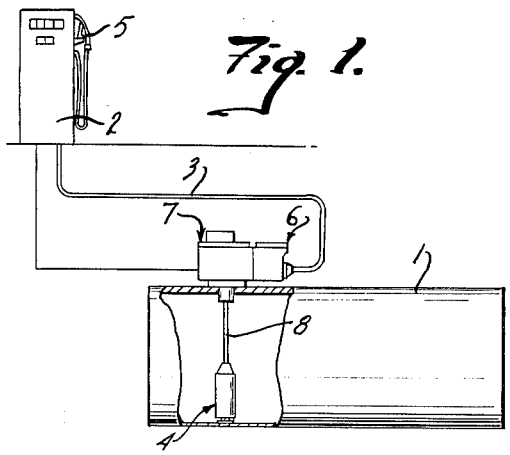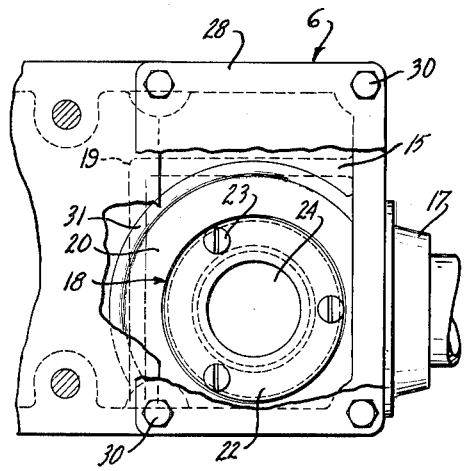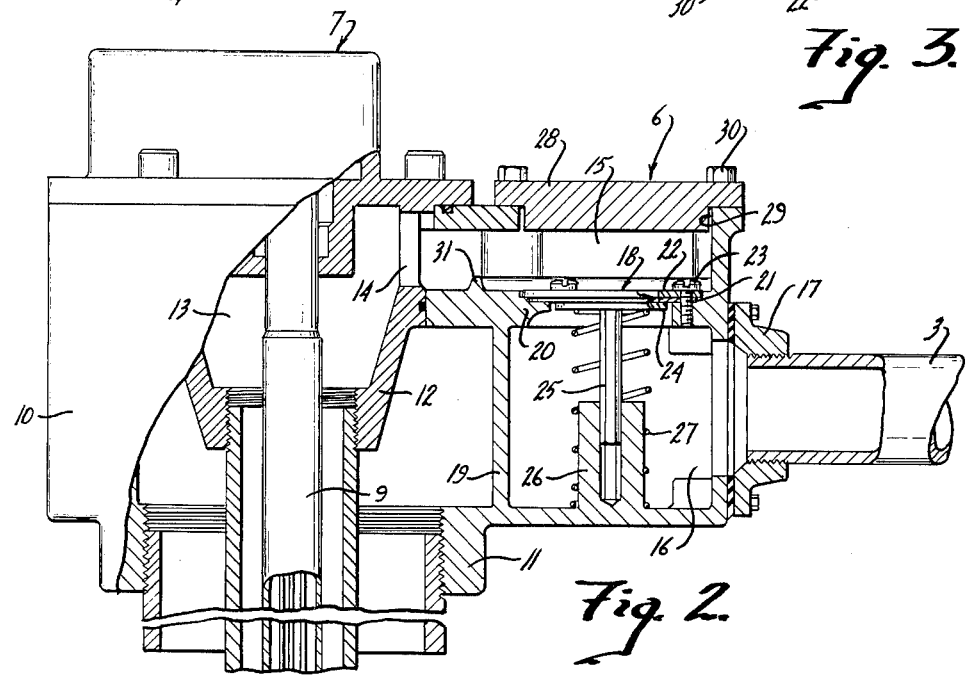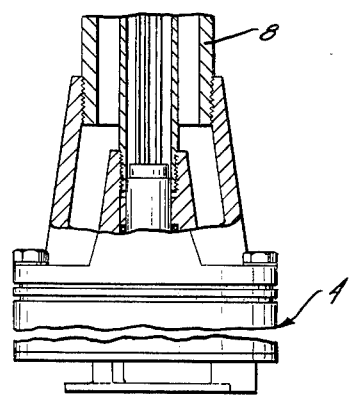
INVENTORS.
IRVING A. JOHNSON
STEPHEN STASENKO
BY Andrus & Starke
Attorneys

3,259,280
PETROLEUM PUMPING SYSTEM AND HEADER STRUCTURE
Irving A. Johnson and Stephen Stasenko, Erie, Pa., assignors to A. O. Smith Corporation, Milwaukee, Wis., a corporation of New York
Filed Jan. 25, 1965, Ser. No. 427,884
7 Claims. (Cl. 222—333)

This invention relates to a petroleum pumping system and particularly to a header structure having a check valve for trapping liquid in a main flow line under pressure.

Gasoline pumping systems in service stations and the like generally have the several dispensing pumps spaced from the main storage tank and connected thereto by individual or a common flow line. Dispensing of actual metered quantities is provided by the maintaining of the flow line filled with liquid by suitable check valves at opposite ends of the lines and normally the dispensing pump nozzle and at a header structure at a storage tank. In a highly satisfactory system, a submersible motor-pump unit is mounted on the storage tank structure by a suitable header structure connecting the output of the motor-pump unit to the flow line. A check valve is normally provided in the header structure to prevent the reverse flow from the flow line to the storage tank when the motor-pump unit is de-energized.

Check valves of all practical constructions are subject to wear, deterioration and the like. Consequently, it is desirable to frequently check the valves for effectiveness of operation. In present systems, the access opening is normally in the pressurized side of the line in order to permit access to the check valve structure proper. As a result of the pressurized system, means must be provided for releasing of the pressure and inherently there is spillage of the gasoline.

The present invention is particularly directed to an improved check valve structure forming a part of a gasoline pump dispensing header wherein the check valve is inverted such that it may be inspected for leakage, wear and the like without any essential danger of the escape of the liquid from the pressurized line or any necessity for relieving the pressure therein. In accordance with the present invention, the check valve is mounted within the header and in the flow passageway with its biasing system to the pressurized line side of the check valve such that the flow is through the header to the face of the check valve. When the motor-pump unit is energized, the fluid force is sufficient to force the check valve open by moving it inwardly into the pressurized line portion. The header structure to the input side of the check valve chamber is provided with an access opening. As this is on the unpressurized side of the unit, there is no danger of the liquid in the pressurized line escaping through the access opening when it is not covered.

Preferably in the present invention, the check valve is provided with a vertical movement with the passage or connection to the submersible pump conduit forming a lateral passageway. Immediately above the check valve an access opening is provided. Additionally, a dam or wall means encircles the check valve to maintain a small amount of liquid trapped in an unpressurized condition immediately over the valve. This prevents deterioration of the valve structure by the continual wetting and drying of the unit. When it is desired to check the valve, the operator removes the access opening with a cloth or other suitable device and wipes the trapped liquid away to uncover the valve structure. If any leaks are present, they will of course be visually detected.

The present invention thus provides a highly improved and simplified check valve structure permitting ready checking of the condition of the valve.

The drawing furnished herewith illustrates a preferred construction of the present invention including the above advantages and features as well as others which will be clear from the following description and explanation of the drawing.

In the drawing:

FIG. 1 is a diagrammatic view of a gasoline dispensing system;

FIG. 2 is an enlarged side elevational view with parts broken away and sectioned showing details of the improved valve structure; and FIG. 3 is a reduced fragmentary top view showing the valve structure of the present invention and the access thereto.

Referring to the drawing and particularly to FIG. 1, a gasoline service station is shown including a main storage tank 1 spaced from a dispensing pump 2. Generally, a plurality of dispensing pumps for each storage tank will be provided, one being shown for purposes of simplicity of illustration. A main flow line 3 interconnects the dispensing pump 2 to the output side of a submersible motor-pump unit 4 mounted within the main storage tank 1. The dispensing pump 2 includes the usual nozzle 5 including a final discharge valve structure, not shown. Additionally the dispensing pump 2 will include suitable switch means for actuating the submersible motor-pump unit 4 and thereby conditioning the system for discharge of gasoline. At the main storage tank 1 a check valve assembly 6 forming an integral part of a header structure 7 of motor-pump unit 4 is provided to trap gasoline within the line 3. Consequently, when the dispensing pump 2 is turned on, gasoline is immediately dispensed from the unit without the necessity for waiting until the line 3 is filled as would be the case if a check valve assembly 6 were not employed.

The motor-pump unit 4 is of any suitable construction and is therefore shown in elevation disposed within tank 1 by a support discharge pipe or conduit 8 secured thereto and projecting upwardly concentrically with a central power conduit 9 to the header 7. The header structure 7 may generally be of any suitable structure and is briefly described as it is adapted to the improvement in the check valve assembly 6 which particularly forms the subject matter of the present invention. Generally, structure 7 includes a body portion 10 resting upon tank 1 and having a lower hub 11 projecting inwardly through a suitable opening for venting of tank. An internal wall 12 defines a discharge chamber 13 having a lower threaded opening to which the top of the conduit 8 is secured. Wall 12 includes an arcuate wall opening 14 in the upper portion forming a common portion with a laterally extending transfer chamber or passageway 15 and generally defining an inverted L-shaped discharge chamber to a check valve chamber 16 which is located immediately adjacent to and below the transfer chamber 15. An output coupling 17 connects the outlet side of the check valve chamber 16 to the flow line 3.

The present invention is particularly concerned with and directed to the construction and location of the check valve chamber 16 and a check valve 18 which is mounted therein.

In accordance with the illustrated embodiment of the invention, the chamber 16 is defined by the two adjacent outer walls of assembly 6 and an L-shaped internal vertical wall 19 integrally secured thereto. A horizontal wall 20 which is common to the transfer passageway 15 and to chamber 16 completes chamber 16. Wall 20 includes a stepped opening within which a valve seat member 21 is clamped by a retaining ring and a plurality of circumferentially distributed cap screws 22. A valve closure disc 23 of a diameter in excess of the opening in seat member 21 is mounted beneath the valve seat members 21 and includes a stem 24 secured to the back side thereof and projecting downwardly within chamber 16. The outer or lower end of the stem 24 is journaled within a suitable bearing hub 25 integrally formed on the bottom wall of the check valve chamber 16. A closure spring 26 encircles the stem 24 and hub 25 and acts between the back side of the disc 23 and the base of the chamber 16 to urge the valve to a closed condition. Consequently, when the motor-pump unit 4 is de-energized and the discharge pressure thereof removed, the check valve 18 snaps closed with the valve disc 23 seated on the valve member 21 to close the flow line and prevent reverse flow of the trapped liquid from line 3. When the motor-pump unit 4 is started, the pressure will be built up with the liquid flowing upwardly through the conduit 8, discharge chamber 13, and the transfer passageway 15 to the top side of the valve disc 23. The output pressure of the motor-pump unit 4 is sufficient to compress the closure spring 26 and force the liquid into the flow line 3 and out through the nozzle 5.

In order to permit inspection of the check valve assembly 6, an access cap 27 is secured over a top wall opening 28 by a plurality of cap screws 29. The opening 28 is preferably aligned with and somewhat larger than the valve seating arrangement such that convenient access to and viewing of the valve 18 is provided when the cap 27 is removed. In the illustrated embodiment of the invention, the cap 27 includes a projection into the opening to maintain a relatively smooth top wall to the flowing liquid as it flows from the chamber 13 through the passageway 15 to the check valve chamber 16.

In accordance with the present invention, an upstanding dam or wall 30 is preferably provided about the opening 14 and with the outer walls of unit 6 defining a pool overlying the valve 18. When the motor-pump unit 4 is turned off or de-energized, the liquid within the chamber 13 and the passageway 15 is free to return to the storage tank 1. However, the wall 31 maintains a small pool of the liquid overlying the check valve 18 to prevent deterioration thereof as a result of drying between pumping cycles. However, when the valve 18 is to be checked, the amount of liquid is sufficiently small that it can be readily removed by a suitable cloth or the like and thereby permit complete inspection of the valve. Thus, if there is any leak present in valve 18 and particularly between valve disc 23 and the valve seat member 21, a small amount of liquid will be forced through the valve as a result of pressure in line 3. However, there is relatively no danger of any substantial amount of the liquid being forced upwardly through the valve 18 particularly of a nature which would cause spraying thereof through the exposure or access opening when the cap is removed.

The present invention thus provides a highly improved, simplified check valve assembly for petroleum dispensing units and the like.

Various modes of carrying out the invention are contemplated as being within the scope of the following claims particularly pointing out and distinctly claiming the subject matter which is regarded as the invention.

We claim:

1. A liquid product delivery system for moving a product under pressure from a storage tank to a dispensing means, comprising
   a flow line,
   a control valve at the discharge end of the flow line,
   a header assembly connected to the input end of the flow line, said header assembly being a discharge chamber above a check valve chamber with a valve opening therebetween,
   a check valve disposed in the check valve chamber and urged upwardly into sealing engagement with the wall of the valve opening, whereby upon closure of the control valve liquid is trapped in the check valve chamber and drains from the discharge chamber, and
   access means to said discharge chamber aligned with the check valve.

2. The delivery system of claim 1 having means to maintain a liquid pool overlying the check valve within the discharge chamber.

3. In a petroleum product delivery system having a submersible motor-pump assembly for moving a petroleum product under pressure through a discharge line, the combination comprising
   a control valve at the discharge end of the discharge line,
   a header assembly for the submersible motor-pump assembly having an upper discharge chamber and a lower check valve chamber with a common wall therebetween,
   an output passageway connected to the valve chamber,
   a check valve disposed in the check valve chamber and urged upwardly into sealing engagement with the wall, whereby upon closure of the control valve liquid is trapped in the check valve chamber and drains from the discharge chamber, and
   access means in the top wall of said discharge chamber aligned with the check valve.

4. In a petroleum product delivery system having a submersible motor-pump assembly for moving a petroleum product under pressure through a discharge line, the combination comprising
   a control valve at the discharge end of the discharge line,
   a header assembly for the submersible motor-pump assembly having an upper discharge chamber and a lower check valve chamber having a common horizontal dividing wall with a valve opening, a wall encircling the opening and defining a shallow dam,
   an output passageway connected to the valve member,
   a check valve disposed in the check valve chamber and having a member urged upwardly into sealing engagement about the opening, whereby upon closure of the control valve liquid is trapped in the check valve chamber and drains from the discharge chamber, said shallow dam retaining a small quantity of the petroleum product overlying the opening and valve, and
   access means to said discharge chamber aligned with the check valve.

5. A header assembly for mounting a pump unit within a storage tank for pumping of liquid through a discharge line, comprising
   a body portion having means for mounting on the tank and having a pump support means and a discharge chamber having an upper horizontal extension and a check valve chamber immediately below the horizontal extension with an aperture therebetween, said body portion having a top wall access opening aligned with said aperture,
   a cover releasably secured over said top wall access opening, and
   a check valve assembly having a valve seat secured to the apertured and vertically movable closure member in the valve chamber moving upwardly into engagement with the seat member to seal the aperture.

6. A header assembly for mounting a submersible pump unit within a storage tank for pumping of liquid through a discharge line, comprising
   a body portion having means for mounting on the tank and having a pump support means and including an inverted L-shaped discharge chamber having an upper horizontal extension and a check valve chamber immediately below the horizontal extension with a common apertured wall therebetween, a raised wall portion about the aperture defining a liquid reservoir about the aperture, said body having a top wall access opening aligned with the aperture in said wall, a cover releasably secured over said top wall access opening, and a check valve assembly having a valve seat secured to the apertured and closure member in the valve chamber, said assembly including a resilient means in the valve chamber resiliently urging the closure member into engagement with the seat member to permit transfer of liquid to the valve chamber and to prevent reverse flow from the valve chamber.

7. A header assembly for mounting a submersible motor-pump unit within a vented storage tank for pumping of liquid through a discharge line, comprising a body portion mounted on the tank and having a motor-pump support means depending into the tank and including a discharge conduit terminating in an inverted L-shaped discharge chamber having an upper lateral extension and a check valve chamber immediately below the lateral extension with a common apertured wall therebetween, a raised wall portion about the aperture defining a liquid reservoir about the aperture, said body having a top wall access opening aligned with the aperture in said wall, a cover releasably secured over said top wall access opening, and a check valve assembly having a valve seat secured to the aperture and a closure member in the valve chamber, said assembly including a spring in the valve chamber resiliently urging the closure member into engagement with the seat member to permit transfer of liquid to the valve chamber and to prevent reverse flow from the valve chamber.

References Cited by the Examiner
UNITED STATES PATENTS 2,304,991 12/1942 Foster _____ 103—228 X
3,020,849 2/1962 Reynolds _____ 103—228 X LOUIS J. DEMBO, *Primary Examiner.*

H. LANE, *Assistant Examiner.*

UNITED STATES PATENT OFFICE
CERTIFICATE OF CORRECTION

Patent No. 3,259,280                                July 5, 1966

Irving A. Johnson et al.

It is hereby certified that error appears in the above numbered patent requiring correction and that the said Letters Patent should read as corrected below.

Column 4, line 37, for "member" read -- chamber --.

Signed and sealed this 7th day of November 1967.

(SEAL)
Attest:

Edward M. Fletcher, Jr.                          EDWARD J. BRENNER
Attesting Officer                                        Commissioner of Patents